United States Patent
Gong et al.

(10) Patent No.: US 10,137,765 B2
(45) Date of Patent: Nov. 27, 2018

(54) FRONT-AND-REAR SPLIT DOORS AND ELECTRIC VEHICLE HAVING THE SAME

(71) Applicant: SHENZHEN ZHILUN DRIVING TECHNOLOGY FOR ELECTRIC VEHICLE CO., LTD., Shenzhen, Guangdong (CN)

(72) Inventors: Shugang Gong, Guangdong (CN); Bo Fu, Guangdong (CN); Changliang Li, Guangdong (CN); Yifeng Hu, Guangdong (CN); Yanqiang Guo, Guangdong (CN)

(73) Assignee: SHENZHEN ZHILUN DRIVING TECHNOLOGY FOR ELECTRIC VEHICLE CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/300,702

(22) PCT Filed: Apr. 1, 2014

(86) PCT No.: PCT/CN2014/074552
§ 371 (c)(1),
(2) Date: Sep. 29, 2016

(87) PCT Pub. No.: WO2015/149284
PCT Pub. Date: Oct. 8, 2015

(65) Prior Publication Data
US 2017/0106730 A1 Apr. 20, 2017

(51) Int. Cl.
*B60J 5/06* (2006.01)
*B60J 5/04* (2006.01)
(Continued)

(52) U.S. Cl.
CPC ............... *B60J 5/0472* (2013.01); *B60J 1/12* (2013.01); *B60J 5/048* (2013.01); *B60J 5/0477* (2013.01); *B60J 7/1657* (2013.01)

(58) Field of Classification Search
CPC .. B65F 3/001; B65F 3/08; B65F 3/201; F25D 23/04; F25D 2400/04; A47G 29/1209;
(Continued)

(56) References Cited

U.S. PATENT DOCUMENTS 2,533,752 A * 12/1950 Alamagny ............. B62D 61/00
180/21
2,656,214 A * 10/1953 Alamagny ........... B62D 25/105
296/193.01
(Continued)

FOREIGN PATENT DOCUMENTS

CN 101722821 A 6/2010
CN 102481826 A 5/2012
(Continued)

OTHER PUBLICATIONS

International Search Report, dated Dec. 30, 2014, International Patent Application No. PCT/CN2014/074552 with English translation (6 pages).

*Primary Examiner* — Kiran B Patel
(74) *Attorney, Agent, or Firm* — Hamre, Schumann, Mueller & Larson, P.C.

(57) ABSTRACT

Disclosed is a front-and-rear split door (9) and an electric vehicle having the split door (9), the front-and-rear split door (9) comprises a front compartment door (901) and a rear compartment door (902) configured to open or close a passenger compartment (101), wherein the front compartment door (901) and the rear compartment door (902) are provided above the passenger compartment (101); a front end of the front compartment door (901) is connected to a vehicle body (1) via a first hinge assembly (903), a rear end
(Continued)

of the rear compartment door (902) is connected to the vehicle body (1) via a second hinge assembly (904); and the electric vehicle further comprises a first turning mechanism (905) configured to control the front compartment door (901) to turn outwardly about the first hinge assembly (903) and a second turning mechanism (906) configured to control the rear compartment door (902) to turn outwardly about the second hinge assembly (904). For the vehicle door with front part and rear part opening in opposite directions and the electric vehicle having the vehicle door, there is no need to design an A pillar and a C pillar on the vehicle body, such that the driver can have a broader view, thereby improving the driving comfort, and the weight of the vehicle body will also be reduced, so that the vehicle performance is improved.

11 Claims, 10 Drawing Sheets

(51) Int. Cl.
  *B60J 7/16* (2006.01)
  *B60J 1/12* (2006.01)
(58) Field of Classification Search
  CPC . A47F 3/001; B60H 1/00064; B60H 1/00842; B60H 2001/002
  USPC .................................................. 296/146.13
  See application file for complete search history.

(56) References Cited

U.S. PATENT DOCUMENTS

| | | | | |
|---|---|---|---|---|
| 2,777,728 | A * | 1/1957 | Barenyi | B60J 5/0472 180/11 |
| 2,921,812 | A | 1/1960 | Barenyi | |
| 2,947,567 | A * | 8/1960 | Barenyi | B60J 7/1657 296/146.11 |
| 3,425,740 | A * | 2/1969 | De Vaughn | B60D 35/002 135/117 |
| 3,856,106 | A * | 12/1974 | Sobey | B60V 3/04 180/116 |
| 3,979,147 | A * | 9/1976 | Kelley | B62J 17/08 296/78.1 |
| 5,806,620 | A * | 9/1998 | DeRees | B62D 29/043 180/69.2 |
| 5,806,622 | A * | 9/1998 | Murphy | B60J 5/02 180/210 |
| 6,220,654 | B1 * | 4/2001 | Sommer | B62D 21/10 296/177 |
| 6,312,044 | B1 * | 11/2001 | Vigano' | B60J 5/00 296/100.06 |
| 9,266,413 | B2 * | 2/2016 | Engler | B60J 5/047 |

FOREIGN PATENT DOCUMENTS

| | | |
|---|---|---|
| CN | 102991318 A | 3/2013 |
| GB | 789284 A | 1/1958 |
| JP | 2011068317 A | 4/2011 |

* cited by examiner

FRONT-AND-REAR SPLIT DOORS AND ELECTRIC VEHICLE HAVING THE SAME

TECHNICAL FIELD

The present invention relates to the field of electric vehicle technology, particularly to a front-and-rear split door and an electric vehicle having the same.

BACKGROUND

With the progress of science and the development of automobile industry, the types and styles of vehicles are increasing day by day. In the aspect of appearance design such as vehicle body and so on, foreign vehicle manufacturers have their own inheritance and innovation, the domestic automobile manufacturers are absorbing foreign technology, and also have a great breakthrough and innovation. The structure design of the vehicle body is inseparable from the support from the technologies of stamping, welding and coating, automobile body has to use three of four production lines of the vehicle factory, and a lot of mold development funds are required.

Currently, above the passenger compartment there is a roof, openings are provided on two sides of the passenger compartment, the doors are mostly mounted on the sides of the vehicle body, the openings are covered by the front door and the rear door, such that the openings can be opened and closed, a specific arrangement is as follows: the front portion of the front door is pivotally connected to the vehicle body via a hinge; and the front or rear of the rear door is pivotally connected to the vehicle body via the hinge. Frames are respectively disposed between the front door and a front windshield, and between the front doors and a rear windshield.

However, in the existing vehicle, the frame in the vehicle body will obstruct the driver's vision, which causes some blind spots affecting driving comfort and vision; and the roof and the doors are generally made of metal and therefore have large weight, thereby affecting the performance of the vehicle.

SUMMARY

The object of the present invention is to provide a front-and-rear split doors to resolve the problem existing the prior art that the driving vision is not wide enough.

the present invention provides front-and-rear split door, used in an electric vehicle, comprising a vehicle body and a passenger compartment disposed on the vehicle body, wherein the front-and-rear split door comprises a front compartment door and a rear compartment door configured to open or close a passenger compartment, wherein the front compartment door and the rear compartment door are provided above the passenger compartment; a front end of the front compartment door is connected to a vehicle body via a first hinge assembly, a rear end of the rear compartment door is connected to the vehicle body via a second hinge assembly; and the electric vehicle further comprises a first turning mechanism configured to control the front compartment door to turn outwardly about the first hinge assembly and a second turning mechanism configured to control the rear compartment door to turn outwardly about the second hinge assembly.

Further, the front compartment door comprises a front cover and two front doors respectively connected to two sides of the front cover, the rear compartment door comprises a rear cover and two rear doors respectively connected to two sides of the rear cover; the electric vehicle further comprises a first linkage turning device configured to turn each of the front doors in a linkage manner when turned with front compartment door and a second linkage turning device configured to turn each of the rear doors in a linkage manner when turned with rear compartment door.

Further, the first linkage turning device comprises a third hinge assembly connected between the respective front door and the front cover and a third turning mechanism connected between the respective front door and the vehicle body and is configured to drive the respective front door to turn about the third hinge assembly when the front compartment door is turned; the second linkage turning device comprises a fourth hinge assembly connected between the respective rear door and the rear cover and a fourth turning mechanism connected between the respective rear door and the vehicle body and is configured to drive the respective rear door to turn about the third hinge assembly when the rear compartment door is turned.

Further, the first hinge assembly comprises a first hinge base disposed on the vehicle body and a first hinge member with one end disposed in the first hinge base and rotatable oppositely with respect to the first hinge base, another end of the first hinge member is fixed to the front compartment door; and the second hinge assembly comprises a second hinge base disposed on the vehicle body and a second hinge member with one end disposed in the second hinge base and rotatable oppositely with respect to the second hinge base, another end of the second hinge member is fixed to the rear compartment door.

Further, the first turning mechanism comprises at least one first pneumatic strut with two ends respectively connected to the front compartment door and the vehicle body via universal joints and a first pump configured to fill high-pressure gas to the first pneumatic strut to allow the first pneumatic strut to drive the front compartment door to turn; the second turning mechanism comprises at least one second pneumatic strut with two ends respectively connected to the rear compartment door and the vehicle body via universal joints and a second pump configured to fill high-pressure gas to the second pneumatic strut to allow the second pneumatic strut to drive the rear compartment door to turn.

Further, the third hinge assembly comprises first fixing shafts disposed on two sides of the front cover and third hinge members each with one end sleeving the first fixing shaft and rotatable oppositely with respect to the first fixing shaft, the other end of the third hinge member is fixed to the front door; the fourth hinge assembly comprises second fixing shafts disposed on two sides of the rear cover and fourth hinge members each with one end sleeving the second fixing shaft and rotatable oppositely with respect to the second fixing shaft, the other end of the fourth hinge member is fixed to the rear door.

Further, the third turning mechanism comprises at least one pair of first air springs, two ends of each air spring are respectively connected to the respective front door and the vehicle body via universal joints; the fourth turning mechanism comprises at least one pair of second air springs, the vehicle body is provided with two longitudinal fixing columns on two sides, each of the second air springs is respectively connected to the respective rear door and a top end of the respective fixing column via universal joints.

Further, the front compartment door and/or the rear compartment door is provided with a air window.

Further, the front compartment door and/or the rear compartment door is provided with a handle.

Further, the front compartment door and/or the rear compartment door is made of glass or transparent PC.

Further, at least a part of the front compartment door and/or the rear compartment door is made of crystalline silicon capable of absorbing sunlight.

Further, at least a part of the front compartment door and/or the rear compartment door is covered with a reflective PVC film.

Another object of the present invention is to provide an electric vehicle comprising a vehicle body and a front-and-rear split door mentioned above, from front to rear, the vehicle body is provided with a front luggage compartment, a passenger compartment and a rear luggage compartment, the front-and-rear split door comprises the front compartment door connected to the front end of the passenger compartment and the rear compartment door connected to the rear end of the passenger compartment.

Compared with the prior art, the present invention provides a the electric vehicle with a front-and-rear door, the front compartment door and the rear compartment door are respectively driven by the first turning mechanism and the second turning mechanism, and can respectively turn about the first hinge assembly and the second hinge assembly to open or close the openings of the passenger compartment, there is no need to design an A pillar and a C pillar on the vehicle body, such that the driver can have a broader view, thereby improving the driving comfort, and the weight of the vehicle body will also be reduced, so that the vehicle performance is improved.

DETAILED DESCRIPTION OF THE EMBODIMENT

Figure 1:
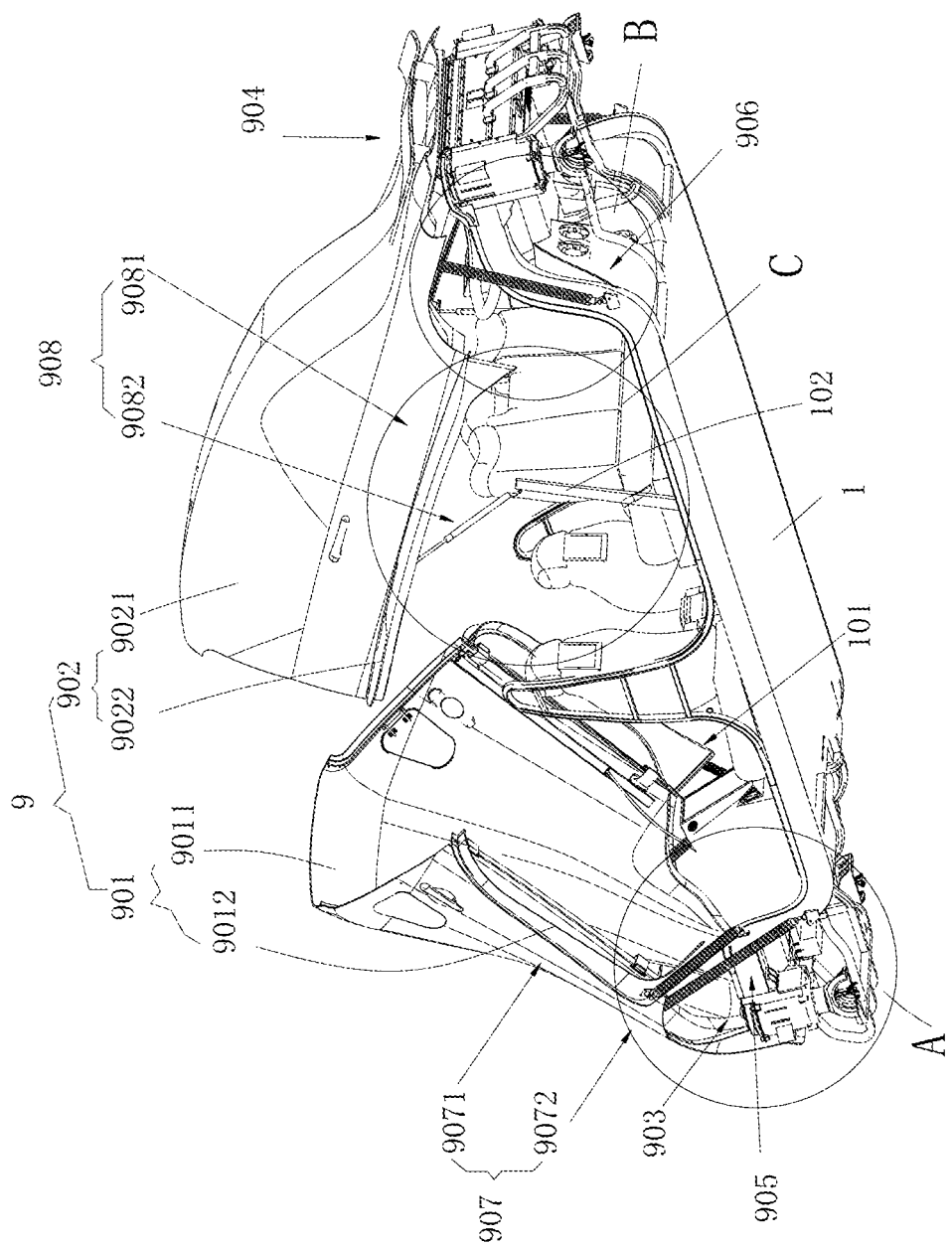
FIG. 1 is of the perspective view of the electric vehicle having front-and-rear door without tire mounted thereon according to an embodiment of the present invention.

To make the objectives, technical solutions, and advantages of the present invention clearer and more comprehensible, the following further describes the present invention in detail referring to the accompanying drawings and embodiments. It should be understood that the specific embodiment described herein is merely used to explain the present invention but is not used to limit the present invention.

The implementation of the present invention is described in detail with reference to specific embodiments in the following.

As shown in FIG. 1 to FIG. 10, the present invention provides a preferred embodiment.

This embodiment provides a front-and-rear split door 9, used in an electric vehicle, comprising a vehicle body 1 and a passenger compartment 101 disposed on the vehicle body 1, wherein the front-and-rear split door comprises a front compartment door 901 and a rear compartment door 902 configured to open or close a passenger compartment 101, wherein the front compartment door 901 and the rear compartment door 902 are provided above the passenger compartment 101; a front end of the front compartment door 901 is connected to a vehicle body 1 via a first hinge assembly 903, a rear end of the rear compartment door 902 is connected to the vehicle body 1 via a second hinge assembly 904; and the electric vehicle further comprises a first turning mechanism 905 configured to control the front compartment door 901 to turn outwardly about the first hinge assembly 903 and a second turning mechanism 906 configured to control the rear compartment door 902 to turn outwardly about the second hinge assembly 904.

In the front-and-rear split door 9, the front compartment door 901 is driven by the first turning mechanism 905 to turn about the first hinge assembly 903 to open and close the front opening of the passenger compartment 101, and the rear compartment door 902 is driven by the second turning mechanism 906 to turn about the second hinge assembly 904 to open and close the opening of the passenger compartment 101, so that there is no need to design an A pillar and a C pillar on the vehicle body 1, such that the driver can have a broader view, thereby improving the driving comfort, and the weight of the vehicle body 1 will also be reduced, so that the vehicle performance is improved.

In this embodiment, referring to FIG. 1, FIG. 4 to FIG. 6, the first hinge assembly 903 comprises a first hinge base 9031 disposed on the vehicle body 1 and a first hinge member 9032 with one end disposed in the first hinge base 9031 and rotatable oppositely with respect to the first hinge base 9031. The first hinge base 9031 comprises a fixing groove 9033 horizontally disposed on the vehicle body 1, the fixing groove 9033 is parallel to the width direction of the vehicle. The first hinge member 9032 is a plate which is bended, one end of the bended plate hinged with the first hinge base 9031 is provided with a circular cross-section matched with the fixing groove 9033, the other end of the first hinge member 9032 extends out of the opening of the fixing grooves 9033 and is fixed to the front compartment door 901, the turning of the first hinge member 9032 is limited by an opening angle of the opening of the fixing grooves 9033. The second hinge assembly 904 comprises a second hinge base disposed on the rear end of the vehicle body 1 and a second hinge member with one end disposed in the second hinge base and rotatable oppositely with respect to the second hinge base. The second hinge base and the second hinge member have the same shapes and arrangements as the first hinge base and the first hinge member. Another end of the second hinge member is fixed to the rear compartment door 902.

Figure 2:
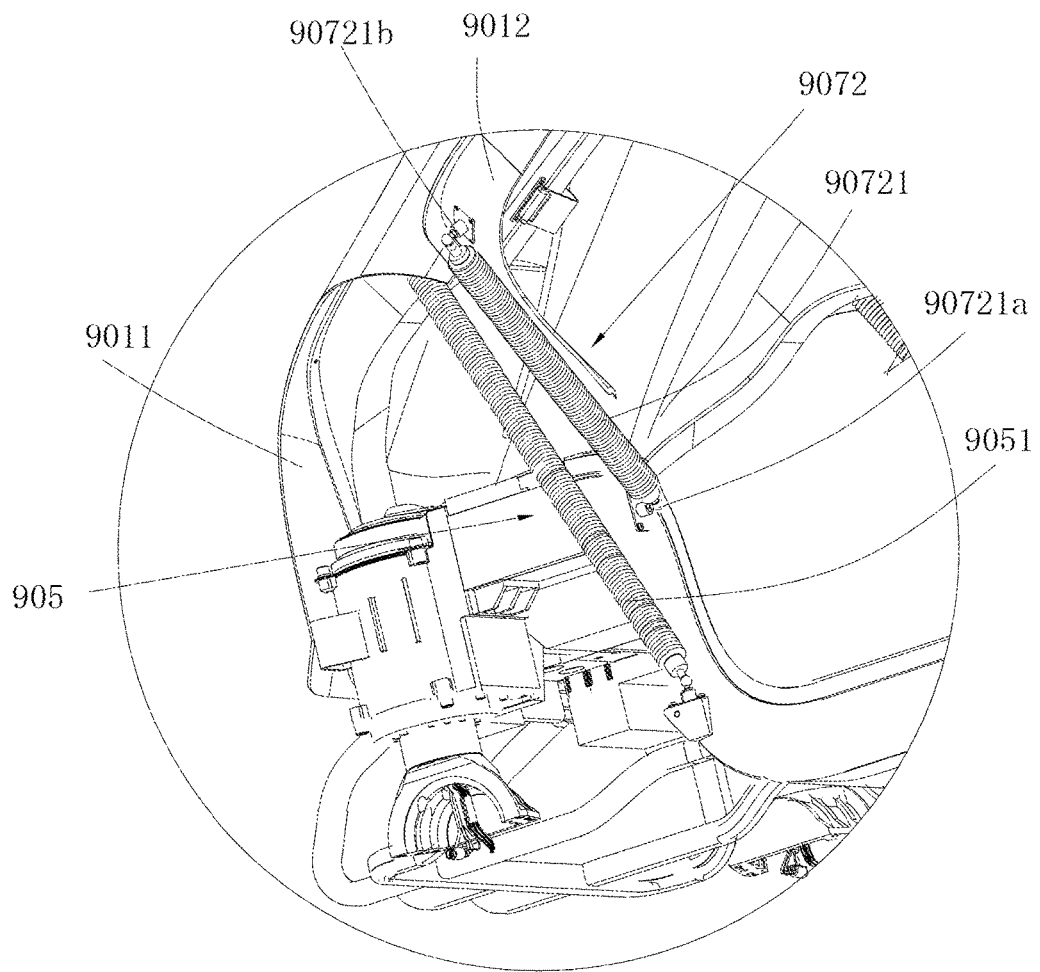
FIG. 2 is an enlarged view of section A in FIG. 1.
Figure 3:
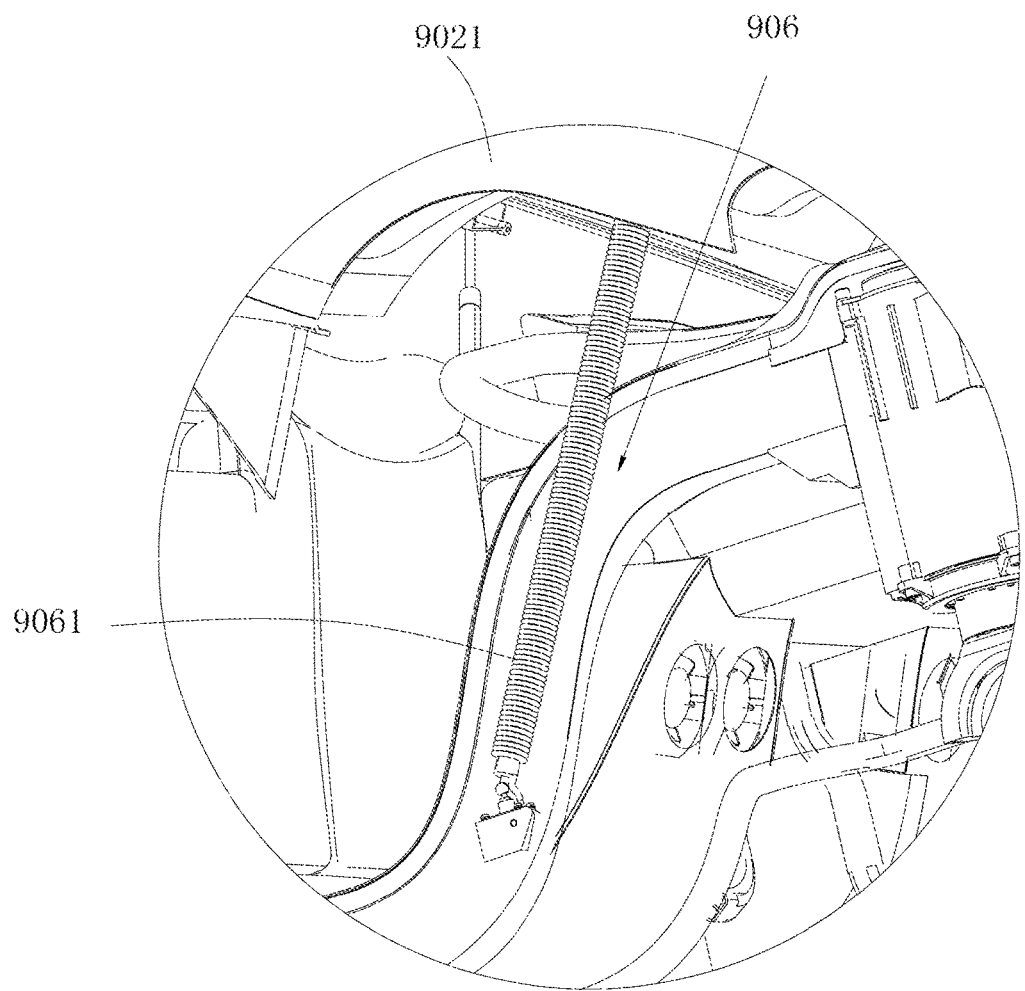
FIG. 3 is an enlarged view of portion B in FIG. 1.

Referring to FIGS. 1 and 2, the first turning mechanism 905 comprises a pair of first pneumatic struts disposed on two sides of the front portion of the passenger compartment 101 and a first pump configured to fill high-pressure gas to the first pneumatic strut 9051 to allow the first pneumatic strut 9051 to drive the front compartment door 901 to turn, two ends of each first pneumatic strut 9051 are respectively connected to the front compartment door 901 and the vehicle body 1 via universal joints. The second turning mechanism 906 comprises a pair of second pneumatic struts 9061 disposed on two sides of the rear portion of the passenger compartment 101 and a second pump configured to fill high-pressure gas to the second pneumatic strut 9061 to allow the second pneumatic strut 9061 to drive the rear compartment door 902 to turn, two ends of each second pneumatic strut 9061 are respectively connected to the rear compartment door 902 and the vehicle body 1 via universal joints.

To allow the passengers in and out of the vehicle easier, it can be seen from FIG. 1, the front compartment door 901 comprises a front cover 9011 and two front doors 9012 respectively connected to two sides of the front cover 9011; the rear compartment door 902 comprises a rear cover 9021 and two rear doors 9022 respectively connected to two sides of the rear cover 9021. The front cover 9011 and the rear cover 9021 are arc shaped, a front side of the front cover body 9011 is served as a windshield, the front cover 9011 and the rear cover 9021 are made of glass or transparent material, and coated with insulation film. The electric vehicle further comprises a first linkage turning device 907 configured to turn each of the front doors 9012 in a linkage manner when turned with front compartment door 901 and a second linkage turning device 908 configured to turn each of the rear doors 9022 in a linkage manner when turned with rear compartment door 902. Thus, when the front compartment door 901 and the rear compartment door 902 are opened, the front door 9012 and the rear compartment door 9022 are turned outwardly simultaneously at the same time and form a flat extending state like a crane, which enlarges the space for getting on and off on both sides of the electric vehicle, to facilitate getting in and out of the car for the passengers.

Of course, the front compartment door 901 and the rear compartment door 902 may be formed integrally, it just have to make sure that the front compartment door 901 and rear compartment door 902 has a larger angle when they are opened.

In this embodiment, the first linkage turning device 907 comprises a third hinge assembly 9071 connected between the respective front door 9012 and the front cover 9011 and a third turning mechanism 9072 connected between the respective front door 9012 and the vehicle body 1 and configured to drive the respective front door 9012 to turn about the third hinge assembly 9071 when the front compartment door 901 is turned; the second linkage turning device 908 comprises a fourth hinge assembly 9081 connected between the respective rear door 9022 and the rear cover 9021 and a fourth turning mechanism 9082 connected between the respective rear door 9022 and the vehicle body 1 and is configured to drive the respective rear door 9022 to turn about the third hinge assembly 9081 when the rear compartment door 902 is turned.

Figure 7:
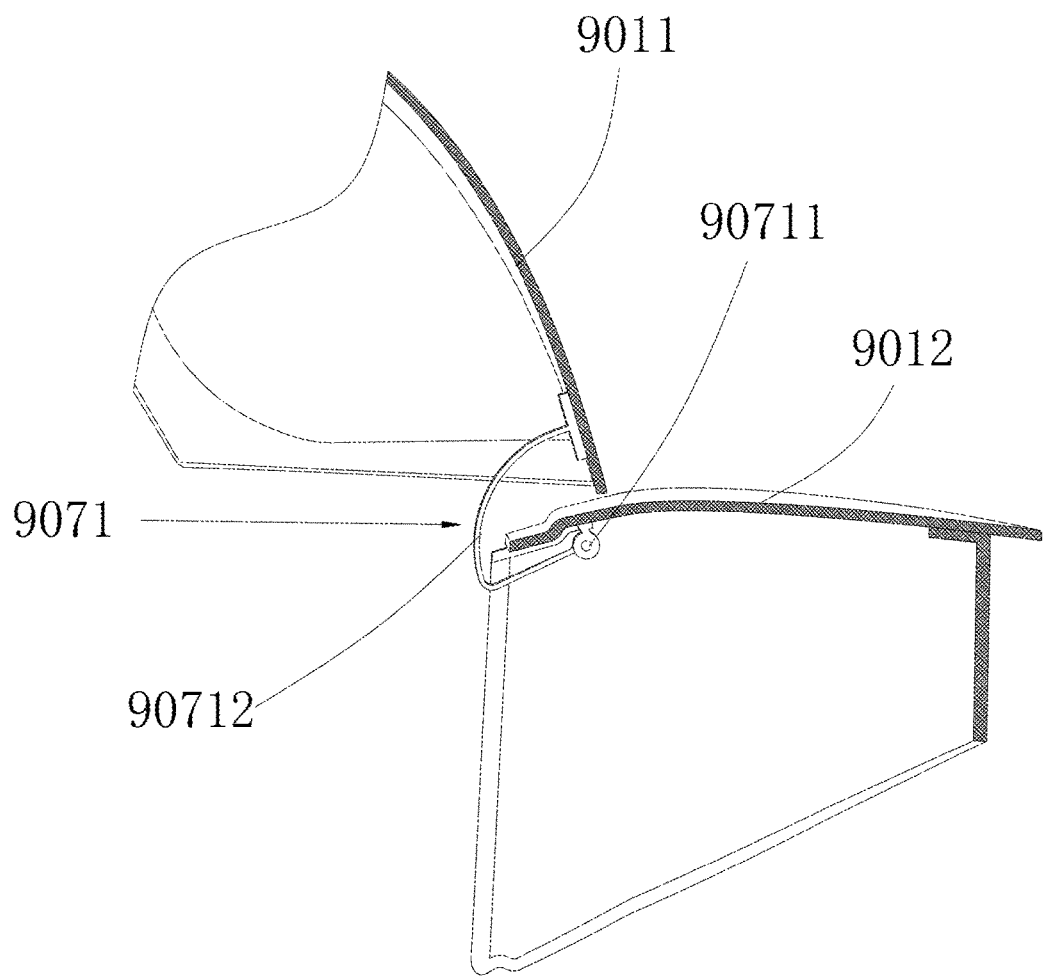
FIG. 7 is a partial cross-sectional view of the connection between the front cover and the front door in the electric vehicle according to an embodiment of the present invention.
Figure 8:
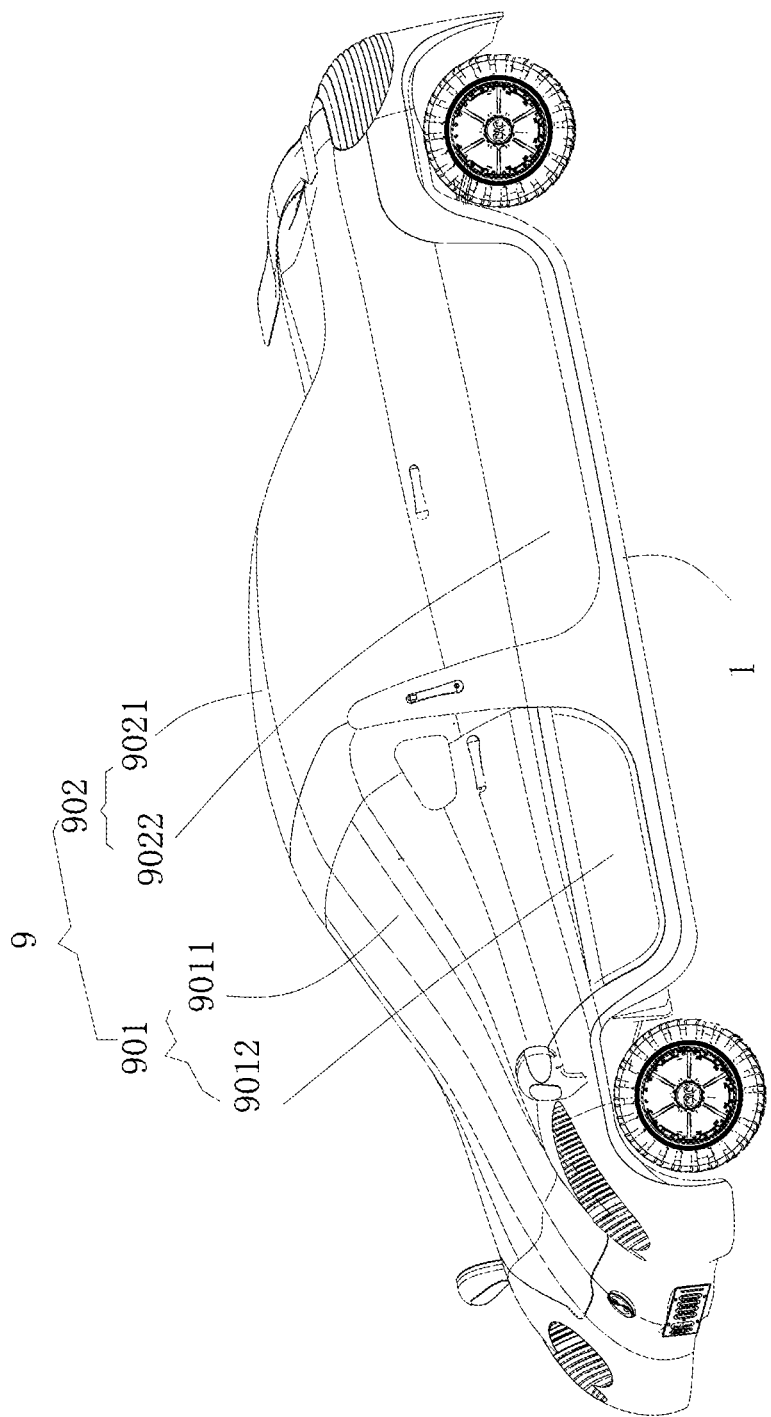
FIG. 8 shows a first state of the electric vehicle according to an embodiment of the present invention.
Figure 9:
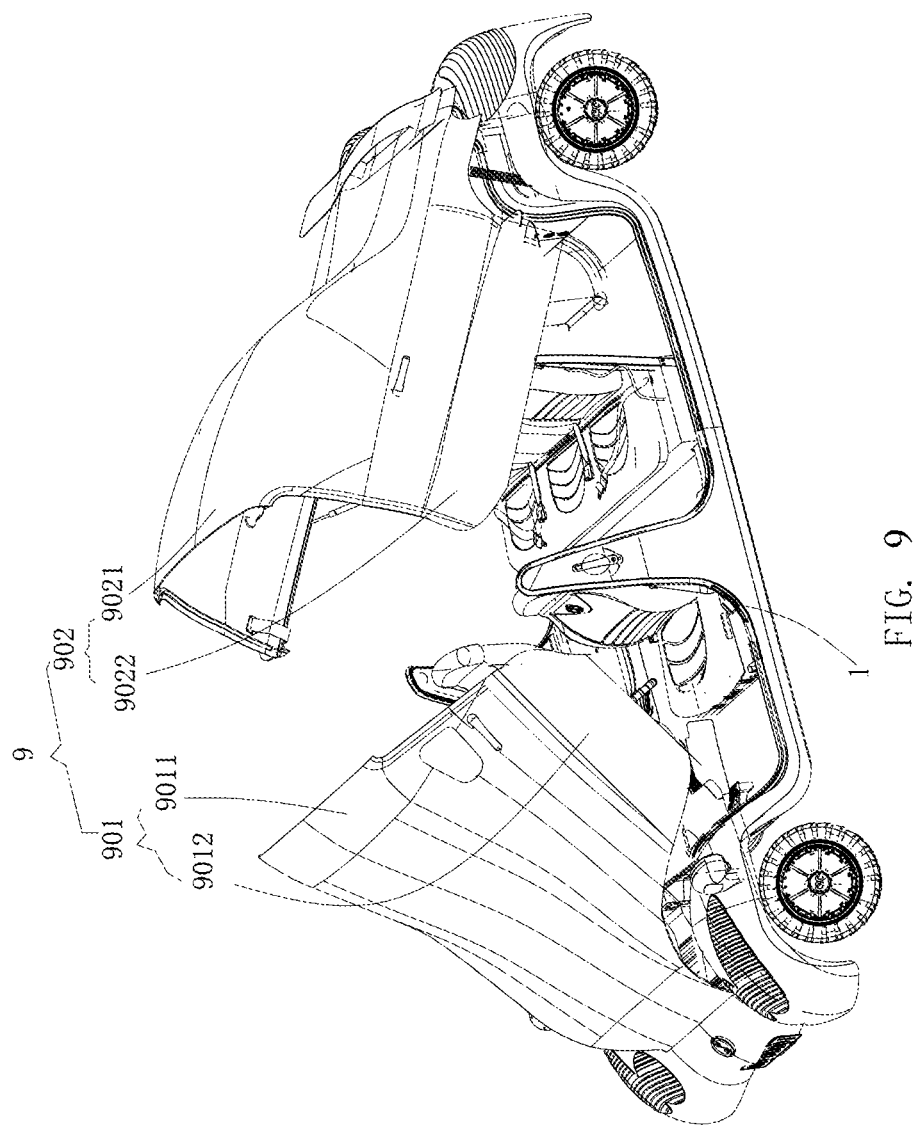
FIG. 9 shows a second state of the electric vehicle according to an embodiment of the present invention.
Figure 10:
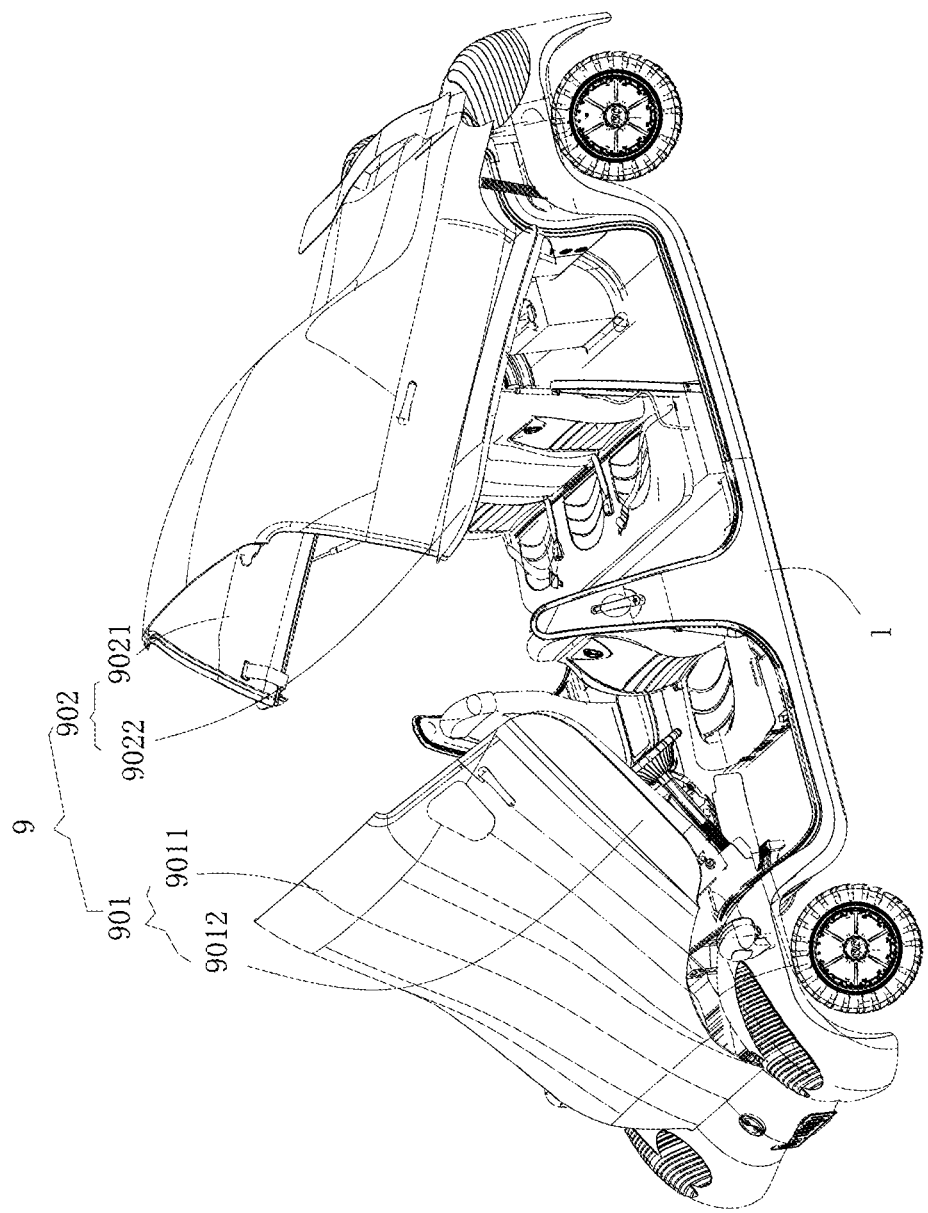
FIG. 10 shows a third state of the electric vehicle according to an embodiment of the present invention.

Referring to FIGS. 1 and 7, the third hinge assembly 9071 comprises first fixing shafts 90711 disposed on two sides of the front cover 9011 and third hinge members 90712 each with one end sleeving the first fixing shaft 90711 and rotatable oppositely with respect to the first fixing shaft 90711, the other end of the third hinge member 90712 is fixed to the front door 9012, the third hinge assembly 9071 comprises a flat surface portion hinged with the first fixing shaft 90711 and an arc surface portion connected with the front door 9012; the fourth hinge assembly 9081 comprises second fixing shafts 90811 disposed on two sides of the rear cover 9021 and each with one end sleeving the second fixing shaft 90811 and rotatable oppositely with respect to the second fixing shaft 90811, the other end of the fourth hinge member 90812 is fixed to the rear door 9022. The connection manner and shape of the second fixing shafts 90811 and the fourth hinge members 90812 are the same as the first fixing shafts 90711 and the third hinge members 90712 respectively.

Figure 4:
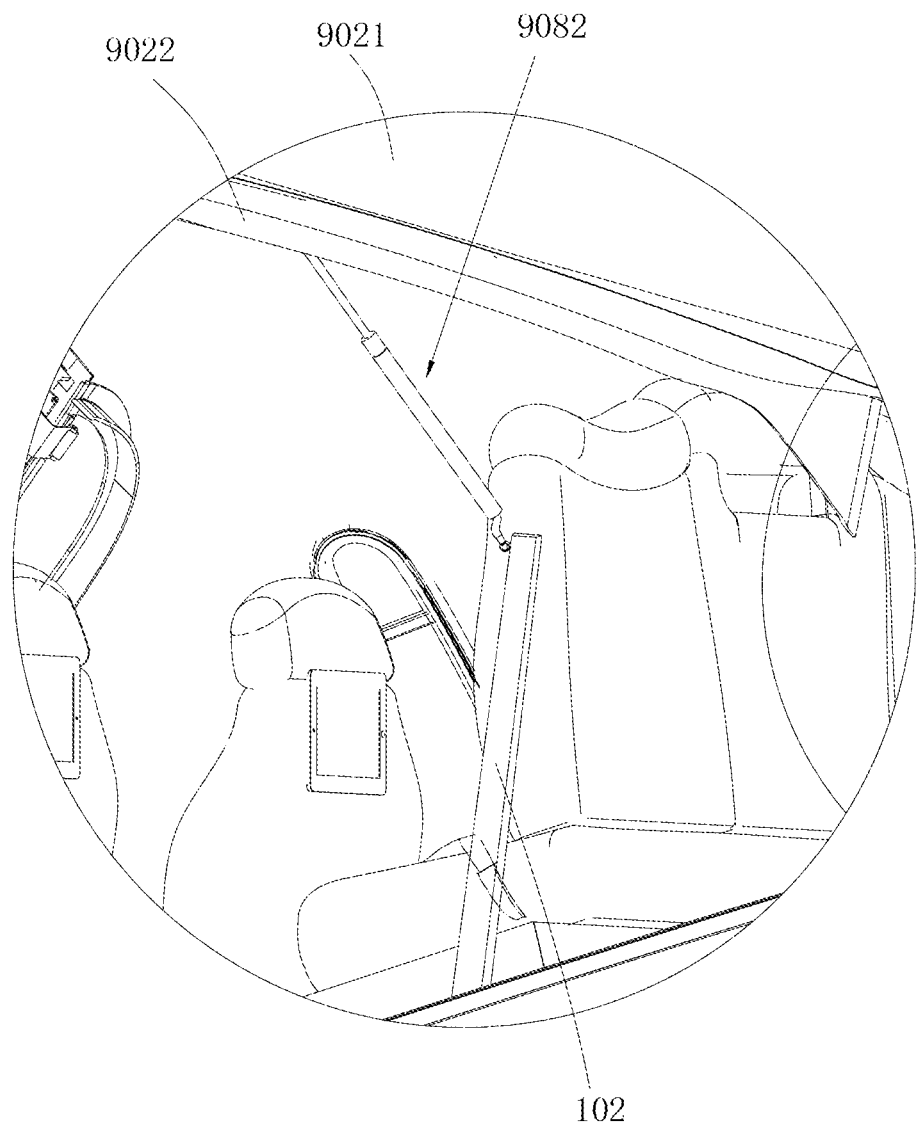
FIG. 4 is an enlarged view of portion C in FIG. 1.
Figure 5:
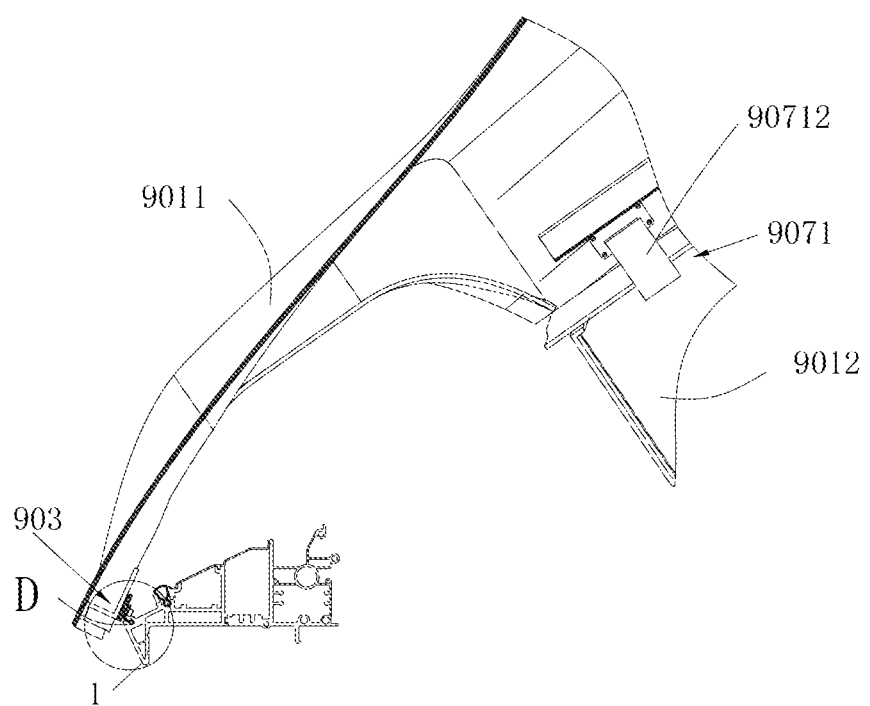
FIG. 5 is a partial cross-sectional view of the connection between the front compartment door and the vehicle body in the electric vehicle according to an embodiment of the present invention.
Figure 6:
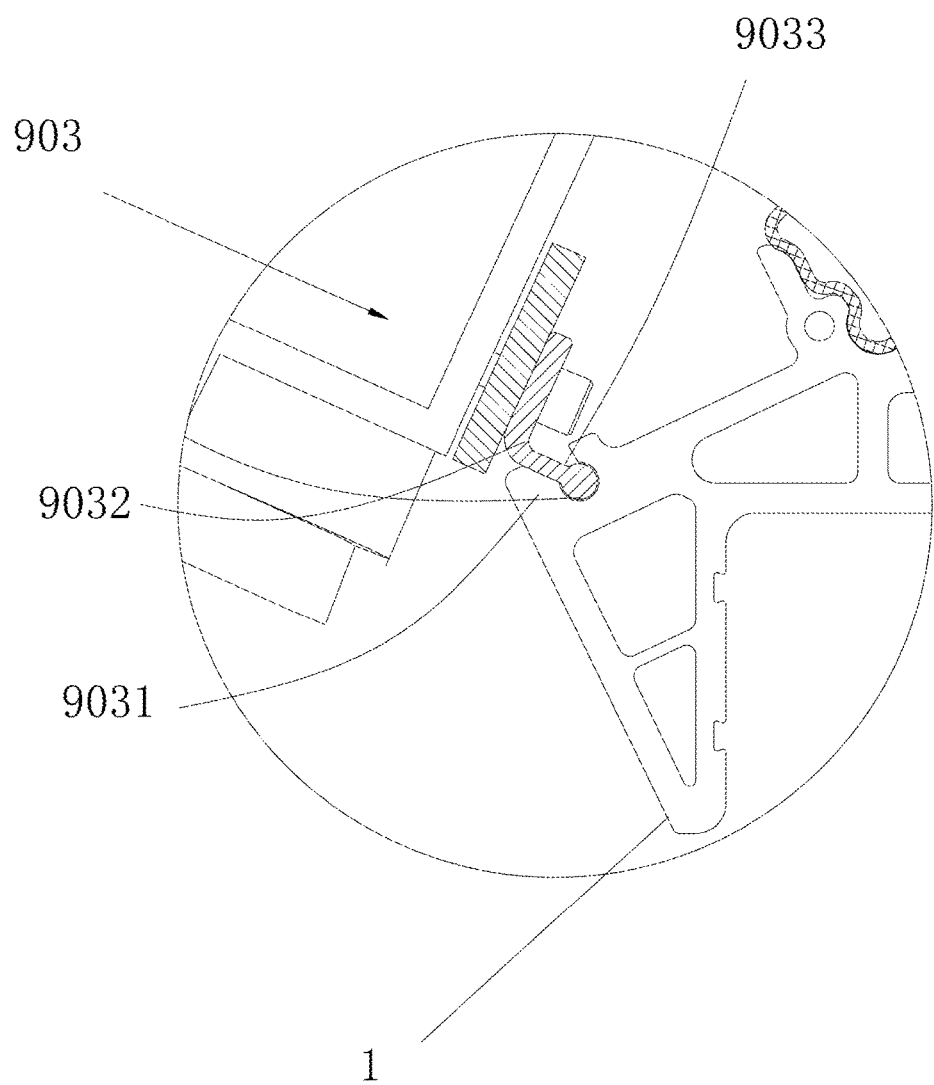
FIG. 6 is an enlarged view of portion D in FIG. 5.

The third reversing mechanism 9072 comprises a pair of first air springs 90721, from FIGS. 1, 2 and 4, it can be seen that each of the first air spring 90721 comprises a first end 90721a connected to the vehicle body 1 via the universal joint and a second end 90721b connected to the front door 9012. When the front compartment door 901 is closed, the first end 90721a is above the second end 90721b, the first air springs are rotated 90721 with the front compartment door 901 when the front compartment door 901 is opening, the rotation surface of the first air springs and the rotation surface of the first pneumatic strut 9051 has a certain angle. When the front compartment door 901 is opened, the first end 90721a is below the second end 90721b. The fourth turning mechanism 9082 comprises a pair of second air spring 90821, the vehicle body 1 is provided with two longitudinal fixing columns 102 on two sides, each of the second air springs 90821 is respectively connected to the respective rear door 9022 and a top end of the respective fixing column 102 via universal joints. The fourth turning mechanism 9082 has the same structure as the turning mechanism 9072.

The front compartment door 901 and the rear compartment door 902 may be respectively turned forth and back synchronously or asynchronously, that is, they are turned like a bloom. The front door 9012 and the rear door 9022 also may be respectively turned broadwise synchronously or asynchronously, that is, they are turned like the procedure that the crane expands its wings. In order to limit the magnitude of turning, and to avoid the damage caused by the turning of large angle, the first pneumatic strut 9051, the second pneumatic strut 9061, the first air spring 90721, and the second air spring 90821 may be respectively provided with a travel-limiting block.

In order to achieve air circulation between inside and outside of the vehicle, the front compartment door 901 and/or the rear compartment door 902 is provided with an air window 909. The air window 909 may be adjusted manually or electrically to meet the requirements of the vehicle ventilation required by the passengers when the air conditioning isn't used.

In order to manually open and close the front compartment door 901 and the rear compartment door 902 of the passenger compartment 101, the front compartment door 901 and the rear compartment door 902 is provide with a handle.

The front compartment door 901 and/or the rear compartment door 902 is made of glass or transparent PC. In order to make use of the sunlight, at least a part of front compartment door 901 and/or the rear compartment door 902 is made of crystalline silicon capable of absorbing sunlight, to use solar energy to supplement the energy of the power supply system of the vehicle.

To avoid premature aging caused by the sun, front compartment door 901 and/or the rear compartment door 902 is covered with a reflective PVC film.

The opening procedure and principle of the front compartment door 901 of the electric vehicle of the present invention are described in the follow with reference to FIGS. 1, 8 to 10.

The present invention also provides electric vehicle comprising a vehicle body and a front-and-rear split door mentioned above, from front to rear, the vehicle body is provided with a front luggage compartment, a passenger compartment 101 and a rear luggage compartment, the front-and-rear split door comprises the front compartment door 901 connected to the front end of the passenger compartment 101 and the rear compartment door 902 connected to the rear end of the passenger compartment 101.

In the electric vehicle mentioned above, the front compartment door 901 may be turned outwardly to open and close the front opening of the passenger compartment 101, and the rear compartment door 902 may be turned outwardly and oppositely with respect to front compartment door 901 to open and close the opening of the passenger compartment 101, so that there is no need to design an A pillar and a C pillar on the vehicle body 1, such that the driver can have a broader view, thereby improving the driving comfort, and the weight of the vehicle body 1 will also be reduced, so that the vehicle performance is improved.

When the front compartment door 901 is closed, the first end 90721a of the first air spring 90721 is above the second end 90721b of the first air spring 90721, the first air spring 90721 is in force equilibrium state. When the front compartment door 901 is turned outwardly about the first hinge assembly 903 through the first pneumatic struts 9051, the first air spring 90721 is pulled by the front door 9012 and rotate with the front door 9012, meanwhile the first air spring 90721 is out of the force equilibrium state, the first air spring 90721 extends out of the push shaft due to the internal pressure thereof, there is an angle between the plane where the first air spring 90721 rotates and the plane where the first pneumatic strut 9051 rotates; when the front compartment door 901 is opened to the highest level, the front door 9012 extend to a position where the first air spring 90721 has a maximum stroke, at this time the first end 90721a is below the second end 90721b.

The opening process and principle of the rear compartment door 902 is the same as that of front compartment door 901, and will not be described repeatedly below.

The foregoing descriptions are merely exemplary embodiment of the present invention, but are not intended to limit the present invention. Any modification, equivalent replacement, or improvement made without departing from the spirit and principle of the present invention shall fall within the protection scope of the present invention.

What is claimed is:

1. A front-and-rear split door, used in an electric vehicle, comprising a vehicle body and a passenger compartment disposed on the vehicle body, wherein the front-and-rear split door comprises a front compartment door and a rear compartment door configured to open or close the passenger compartment, wherein the front compartment door and the rear compartment door are provided above the passenger compartment, wherein the front compartment door comprises a front cover and two front doors respectively connected to two sides of the front cover, the rear compartment door comprises a rear cover and two rear doors respectively connected to two sides of the rear cover;

a front end of the front compartment door is connected to the vehicle body via a first hinge assembly, a rear end of the rear compartment door is connected to the vehicle body via a second hinge assembly; and the electric vehicle further comprises a first turning mechanism configured to control the front compartment door to turn outwardly about the first hinge assembly and a second turning mechanism configured to control the rear compartment door to turn outwardly about the second hinge assembly, and a first linkage turning device configured to turn each of the two front doors in a linkage manner when turned with the front compartment door and a second linkage turning device configured to turn each of the two rear doors in a linkage manner when turned with the rear compartment door, wherein the front compartment door and/or the rear compartment door is provided with an air window.

2. The front-and-rear split door of claim 1, wherein the front compartment door and/or the rear compartment door is provided with a handle.

3. The front-and-rear split door of claim 1, wherein the front compartment door and/or the rear compartment door is made of at least two layers of glass or transparent PC.

4. The front-and-rear split door of claim 1, wherein the first linkage turning device comprises a third hinge assembly connected between the respective front door and the front cover and a third turning mechanism connected between the respective front door and the vehicle body and is configured to drive the respective front door to turn about the third hinge assembly when the front compartment door is turned, the second linkage turning device comprises a fourth hinge assembly connected between the respective rear door and the rear cover and a fourth turning mechanism connected between the respective rear door and the vehicle body and configured to drive the respective rear door to turn about the third hinge assembly when the rear compartment door is turned.

5. The front-and-rear split door of claim 1, wherein the first hinge assembly comprises a first hinge base disposed on the vehicle body and a first hinge member with one end disposed in the first hinge base and rotatable oppositely with respect to the first hinge base, another end of the first hinge member is fixed to the front compartment door, and the second hinge assembly comprises a second hinge base disposed on the vehicle body and a second hinge member with one end disposed in the second hinge base and rotatable oppositely with respect to the second hinge base, another end of the second hinge member is fixed to the rear compartment door.

6. The front-and-rear split door of claim 1, wherein the first turning mechanism comprises at least one first pneumatic strut with two ends respectively connected to the front compartment door and the vehicle body via universal joints and a first pump configured to fill high-pressure gas to the first pneumatic strut to allow the first pneumatic strut to drive the front compartment door to turn, and the second turning mechanism comprises at least one second pneumatic strut with two ends respectively connected to the rear compartment door and the vehicle body via universal joints and a second pump configured to fill high-pressure gas to the second pneumatic strut to allow the second pneumatic strut to drive the rear compartment door to turn.

7. The front-and-rear split door of claim 5, wherein the first turning mechanism comprises at least one first pneumatic strut with two ends respectively connected to the front compartment door and the vehicle body via universal joints and a first pump configured to fill high-pressure gas to the first pneumatic strut to allow the first pneumatic strut to drive the front compartment door to turn, and the second turning mechanism comprises at least one second pneumatic strut with two ends respectively connected to the rear compartment door and the vehicle body via universal joints and a second pump configured to fill high-pressure gas to the second pneumatic strut to allow the second pneumatic strut to drive the rear compartment door to turn.

8. The front-and-rear split door of claim 4, wherein the third hinge assembly comprises first fixing shafts disposed on two sides of the front cover and third hinge members each with one end sleeving the first fixing shaft and rotatable oppositely with respect to the first fixing shaft, the other end of the third hinge member is fixed to the front door, and the fourth hinge assembly comprises second fixing shafts disposed on two sides of the rear cover and fourth hinge members each with one end sleeving the second fixing shaft and rotatable oppositely with respect to the second fixing shaft, the other end of the fourth hinge member is fixed to the rear door.

9. The front-and-rear split door of claim 4, wherein the third turning mechanism comprises at least one pair of first air springs, two ends of each air spring are respectively connected to the respective front door and the vehicle body via universal joints, and the fourth turning mechanism comprises at least one pair of second air springs, the vehicle body is provided with two longitudinal fixing columns on two sides, each of the second air springs is respectively connected to the respective rear door and a top end of the respective fixing column via universal joints.

10. The front-and-rear split door of claim 8, wherein the third turning mechanism comprises at least one pair of first air springs, two ends of each air spring are respectively connected to the respective front door and the vehicle body via universal joints, and the fourth turning mechanism comprises at least one pair of second air springs, the vehicle body is provided with two longitudinal fixing columns on two sides, each of the second air springs is respectively connected to the respective rear door and a top end of the respective fixing column via universal joints.

11. The front-and-rear split door of claim 1, wherein at least a part of the front compartment door and/or the rear compartment door is made of crystalline silicon capable of absorbing sunlight.

* * * * *